(12) United States Patent
Horn et al.

(10) Patent No.: US 7,523,257 B2
(45) Date of Patent: Apr. 21, 2009

(54) METHOD OF MANAGING RAID LEVEL BAD BLOCKS IN A NETWORKED STORAGE SYSTEM

(75) Inventors: Robert L. Horn, Yorba Linda, CA (US); Virgil V. Wilkins, Perris, CA (US)

(73) Assignee: Adaptec, Inc., Milpitas, CA (US)

( * ) Notice: Subject to any disclaimer, the term of this patent is extended or adjusted under 35 U.S.C. 154(b) by 331 days.

(21) Appl. No.: 10/793,883

(22) Filed: Mar. 8, 2004

(65) Prior Publication Data

US 2005/0050383 A1 Mar. 3, 2005

Related U.S. Application Data

(60) Provisional application No. 60/497,919, filed on Aug. 27, 2003.

(51) Int. Cl.
*G06F 12/00* (2006.01)
(52) U.S. Cl. ............... 711/114; 711/162; 714/6; 714/4
(58) Field of Classification Search ........... 711/112, 711/162, 170, 114, 202; 714/6, 5, 4
See application file for complete search history.

(56) References Cited

U.S. PATENT DOCUMENTS

| | | | | |
|---|---|---|---|---|
| 5,777,845 A | * | 7/1998 | Krum et al. ........... | 361/685 |
| 5,826,001 A | * | 10/1998 | Lubbers et al. ........ | 714/6 |
| 5,933,592 A | * | 8/1999 | Lubbers et al. ........ | 714/6 |
| 5,974,544 A | | 10/1999 | Jeffries et al. | |
| 6,243,827 B1 | * | 6/2001 | Renner, Jr. ............ | 714/6 |
| 6,327,679 B1 | | 12/2001 | Russell | |
| 6,347,359 B1 | * | 2/2002 | Smith et al. ........... | 711/114 |
| 6,426,928 B1 | | 7/2002 | Russell | |
| 6,904,599 B1 | * | 6/2005 | Cabrera et al. ........ | 711/114 |
| 7,000,069 B2 | * | 2/2006 | Bruning et al. ....... | 711/114 |
| 7,287,121 B2 | * | 10/2007 | Horn et al. ............ | 711/114 |
| 2002/0035667 A1 | * | 3/2002 | Bruning et al. ....... | 711/114 |
| 2002/0194528 A1 | * | 12/2002 | Hart .................... | 714/6 |
| 2003/0041211 A1 | * | 2/2003 | Merkey et al. ........ | 711/114 |
| 2003/0233611 A1 | * | 12/2003 | Humlicek et al. ..... | 714/763 |

FOREIGN PATENT DOCUMENTS

EP 0 993 709 A2 * 4/1999

* cited by examiner

*Primary Examiner*—Pierre-Michel Bataille
(74) *Attorney, Agent, or Firm*—Dickstein Shapiro LLP

(57) ABSTRACT

A method of managing bad blocks in a RAID storage system. The system restores physical storage media and stripe redundancy by reassigning sectors and creating a bad block tracking structure. The bad block tracking structure consists of a volume map, a redundancy group table, and a bad block table that stores a bad block list. Redundancy is achieved through RAID 1 or RAID 10 mirroring rather than through the parity restoration required by conventional systems. The tracking structure returns media error status data to the originating host on volume read commands. The structure accepts volume write data from the originating host and then deletes the bad block tracking structure.

24 Claims, 6 Drawing Sheets

METHOD OF MANAGING RAID LEVEL BAD BLOCKS IN A NETWORKED STORAGE SYSTEM

This application claims the benefit of U.S. Provisional Application No. 60/497,919, filed Aug. 27, 2003, the disclosure of which is herein incorporated by reference in its entirety.

FIELD OF THE INVENTION

The present invention relates to a networked storage system and, more particularly, to a method of error handling and recovery for RAID data storage systems.

BACKGROUND OF THE INVENTION

With the accelerating growth of Internet and intranet communication, high-bandwidth applications (such as streaming video), and large information databases, the need for networked storage systems has increased dramatically.

The redundant array of independent disks (RAID) configuration is designed to combine multiple inexpensive disk drives into an array to obtain performance, capacity, and reliability that exceeds that of a single large drive. The array of drives can be made to appear to the host computer as a single logical drive.

There are five primary types of array architectures, i.e., RAID 1 through RAID 5, each providing disk fault tolerance with different compromises in features and performance. In addition to these five redundant array architectures, it has become popular to refer to a non-redundant array of disk drives as a RAID 0 array.

RAIDs 0 and 2-5 employ a technique known as striping that writes a block of data across several hard disk drives. This is a method of combining multiple drives into one logical storage unit. Striping partitions the storage space of each drive into stripes, which can be as small as one sector (typically 512 bytes) or as large as several megabytes. These stripes are then interleaved in a rotating sequence, so that the combined space is composed alternately of stripes from each drive. The specific type of operating environment determines whether large or small stripes are used.

RAID 1 employs a technique known as mirroring that writes duplicate data across at least two hard disk drives. Additionally, some storage systems use a combination of RAID 1 and RAID 0. For example, a logical disk drive may be mirrored by two virtual drives, with each of the two virtual drives comprising two striped physical disk drives. Combinations of RAID 1 and RAID 0 are sometimes referred to as RAID 10 or RAID 1+0.

Of the original five RAID types, RAID 5 has become the most popular with networked storage system integrators. It provides an excellent balance between cost and performance while providing redundant data storage. Under RAID 5, parity information is distributed across all the drives. Unlike other striped RAID architectures, RAID 5 has no dedicated parity drive; therefore, all drives contain data, and read operations can be overlapped on every drive in the array. Write operations typically access one data drive and one parity drive. However, because different records store their parity on different drives, write operations can usually be overlapped. The following is a simplified example of how RAID 5 calculates parity and restores data from a failed drive.

Data reconstruction is accomplished by a RAID controller, in conjunction with array management software that examines the sum of each bit position across a slice of all the functional drives in the RAID 5 to assign an even or odd number to the missing data. The missing bit is the exclusive OR (XOR) of the other data bits in the slice including parity. This process is repeated, slice by slice, until the data is rebuilt. If a hard disk drive fails and the host calls for information on that disk, the data is built dynamically from the remaining hard disk drives and placed into memory until a replacement drive is obtained. In this manner, data loss is prevented. Consistent parity is defined as the parity as recorded on the media, and is the XOR of all the data bits as recorded on the media. If the data from one of the members becomes unavailable, that data may be reconstructed if the parity is consistent.

In any non-mirrored, single-parity RAID system (e.g., RAID 5 described above), a hard disk drive media error, under specific circumstances, can cause incorrect data to be written during a drive rebuild event. If, during the rebuild process, one of the hard disk drives providing data to rebuild a degraded hard disk drive's data onto a new hard disk drive suffers an unrecoverable read error, the following happens: 1) The hard disk drive being read re-maps the data from the sector with the media error to a good sector, and 2) the rebuild process for the degraded drive creates an error for the sector being rebuilt. This sector, while fine from the hard disk drive standpoint, now contains corrupt data. It essential that the storage controller responsible for executing read requests to the RAID retains knowledge of this error. Since the rebuilt hard disk drive in the RAID now reports all sectors as good (it has no knowledge of the rebuild failure), the storage controller is now responsible for creating the drive media error response to any host access to the corrupt sector. In this way, these RAID-level "bad blocks" created by the rebuild process are managed.

U.S. Pat. No. 5,933,592, entitled "Promoting Device Level Error to RAIDset Level Error to Restore Redundancy in a RAID Array Data Storage System," describes a RAID array that includes redundant storage devices. Data is distributed across the storage devices and organized as slivers of RAID-protected data blocks. This redundancy provides for the reconstruction of valid data when data at a particular data block of a sliver is found to be inconsistent. However, when more than one data block of a sliver is found to have inconsistent data, reconstruction of the inconsistent data blocks may not be possible. Nonetheless, data consistency can still be restored to that sliver. Consistency is restored to such a sliver by replacing any inconsistent data in a data block with predetermined data and reconstructing the parity data block using the predetermined data. Other data in the RAID array keeps track of those data blocks with the predetermined data to indicate that such blocks do not contain valid data.

Although patent '592 helps to improve system performance by restoring redundancy in RAID data blocks, the system described in patent '592 relies on parity coherency reconstruction to restore redundancy.

SUMMARY OF THE INVENTION

It is therefore an object of the invention to provide a storage system able to maximize overall system performance through efficient management of bad blocks.

The present invention provides a system and method for managing RAID level bad blocks in a storage system. RAID level bad block are blocks of data which contain corrupted information as a result of an incorrect operation of a RAID system. They may be contrasted with regular bad blocks, which contain corrupted information because of a hardware failure. That is, data written to a regular bad block cannot be accurately read back due to a hardware failure, while data in a RAID level bad block is corrupt because the incorrect data was written to the RAID level bad block. An example of an event which may cause a RAID level bad block would be if the RAID controller reads a regular bad block from a surviving disk drive while regenerating the data of a failed disk drive to a new drive. Since incorrect data is read from the (regular) bad block of one of the surviving disk drives, the RAID controller will not be able to generate correct data to be written to the new drive. Since the new drive hardware is functional, there would not be a regular bad block on the new drive. However, since the wrong data was written to the block, the new drive would not include a RAID level bad block. In the present invention, RAID level bad blocks are managed by ensuring physical storage media redundancy and stripe redundancy through the use of mirroring. Additionally, RAID level bad block are managed through a bad block tracking structure. The storage controller utilizes the bad block tracking structure to return a media error in response to a host read request to a RAID level bad block. If a host issues a write command to a RAID level bad block, the block is removed from the bad block tracking structure and written with the requested data.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE PREFERRED EMBODIMENT

Figure 1:
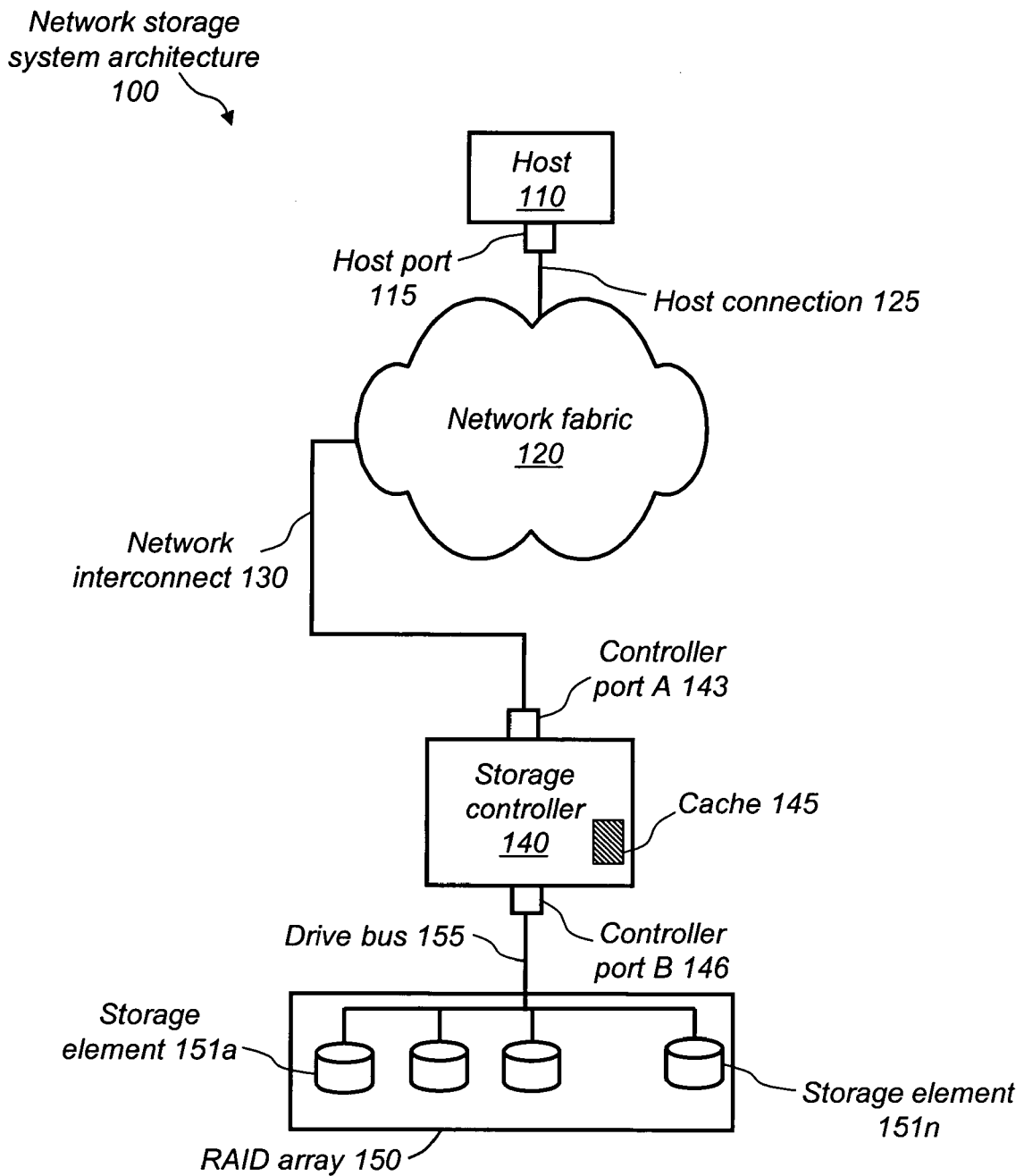
FIG. 1 illustrates a network storage system architecture.

Now referring to the drawings, where like reference numerals designate like elements, there is shown in FIG. 1 a storage system architecture 100 that includes a host 110, a host connection 125, a network fabric 120, a network interconnect 130, a storage controller 140, a drive bus 155, and a RAID array 150. Host 110 further includes a host port 115. Storage controller 140 further includes a controller port A 143, a cache 145, and a controller port B 146. The storage system architecture 100 is illustrated as a network storage system, however, the principles of the present invention may also be applied to non-networked storage systems.

RAID 150 further includes storage elements 151a-n. In general, "n" is used herein to indicate an indefinite plurality, so that the number "n" when referred to one component does not necessarily equal the number "n" of a different component. Storage elements 151a-n are, in this example, hard disk drives.

Host 110 is electrically connected to network fabric 120 via host connection 125 through host port 115. Storage controller 140 is electrically connected to network fabric 120 via network interconnect 130 and controller port A 143. RAID array 150 is electrically connected to storage controller 140 via drive bus 155 and controller port B 146. Network fabric 120 is a dedicated network topology for storage access consisting of any of a number of connection schemes as required for the specific application and geographical location relative to elements of the storage area network. Storage controller 140 is an enterprise-class RAID controller capable of interconnecting with multiple hosts and controlling large disk arrays.

The configuration shown in network storage system architecture 100 may include any number of hosts, any number of controllers, and any number of interconnects. For simplicity and ease of explanation, only a representative sample of each is shown.

In one exemplary embodiment, storage controller 140 is based on Aristos Logic pipelined transaction processor-based I/O controller architecture as filly disclosed in U.S. patent application Ser. No. 10/429,048, entitled, "SCALABLE TRANSACTION PROCESSING PIPELINE," and U.S. patent application Ser. No. 09/716,195, entitled "INTEGRATED I/O CONTROLLER," the entire disclosures of which are hereby incorporated by reference.

In one operational example, host 110 issues a read request for a logical volume located in RAID array 150. In this example, host 110 transmits the read request to storage controller 140 via host port 115, host connection 125, network fabric 120, network interconnect 130, and controller port A 143. Storage controller 140 stores the read request in cache 145. Storage controller 140 recognizes that it controls RAID array 150 from volume mapping information stored in cache 145 and reads the requested data from the appropriate storage element 151 via drive bus 155. Storage controller 140 forwards the read complete data and status back to host 110 via controller port A 143, network interconnect 130, network fabric 120, host connection 125, and host port 115. Storage controller 140 then deletes the original stored command.

Figure 2:
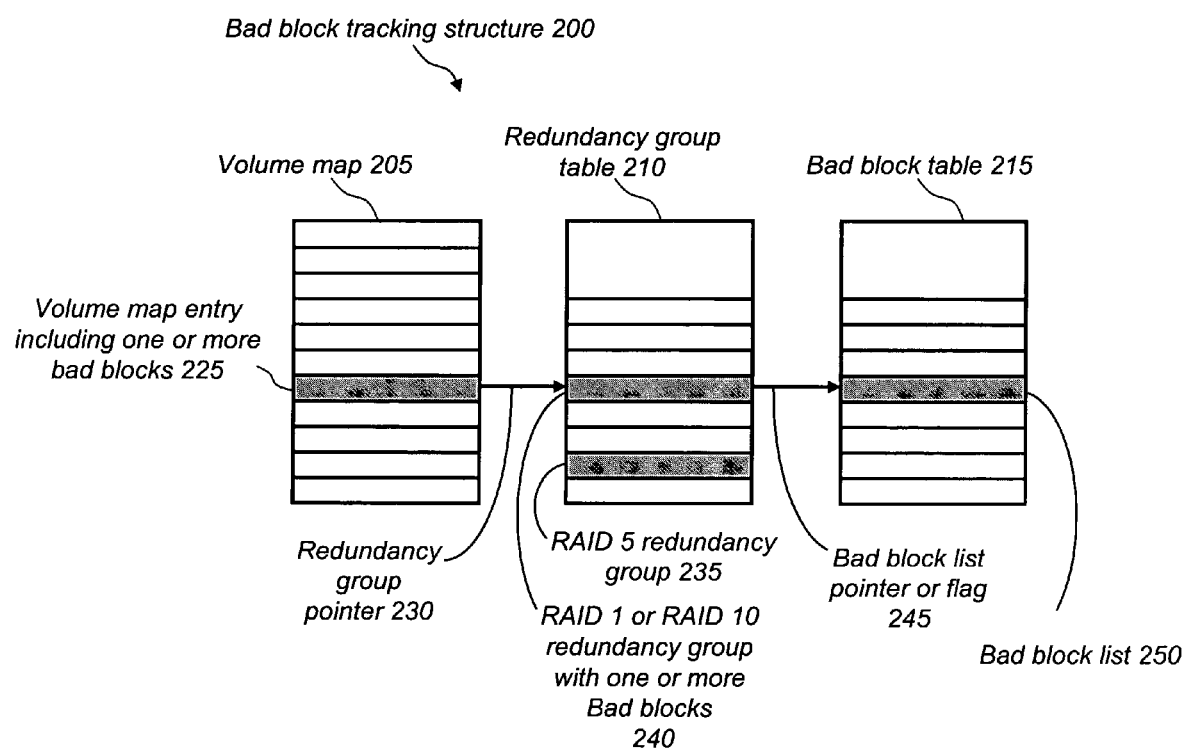
FIG. 2 shows a block diagram of a bad block tracking structure.

FIG. 2 shows a block diagram of a bad block tracking structure 200 that includes a volume map 205, a redundancy group table 210, and a bad block table 215. Volume map 205 further includes an exemplary volume map entry including one or more bad blocks 225. Redundancy group table 210 further includes a RAID 5 redundancy group 235 and a RAID 1 or RAID 10 redundancy group with one or more bad blocks 240. Bad block table 215 further includes a bad block list 250. Volume map 205 is linked to redundancy group table 210 via a redundancy group pointer 230. Redundancy group table 210 indicates a bad block list 250 in bad block table 215 via a bad block list pointer or flag 245.

If a sector has had corrupt data written to it, storage controller 140 must maintain knowledge that the sector is "bad". This presence of one or more bad sectors is represented by volume map entry including one or more bad blocks 225 in volume map 205. In this event, bad block tracking structure 200 re-maps volume map entry including one or more bad blocks 225 from RAID 5 redundancy group 235 to RAID 1 or RAID 10 redundancy group with one or more bad blocks 240 via redundancy group pointer 230. Bad block list pointer or flag 245 indicates which blocks are bad blocks within storage elements 151 so that future volume read requests to the corrupted sector return a media error status to host 110. Bad block tracking structure 200 accepts volume write data to volume map entry including one or more bad blocks 225 and deletes the corresponding bad block tracking structure 200. This operation is explained in detail in FIG. 3.

Figure 3:
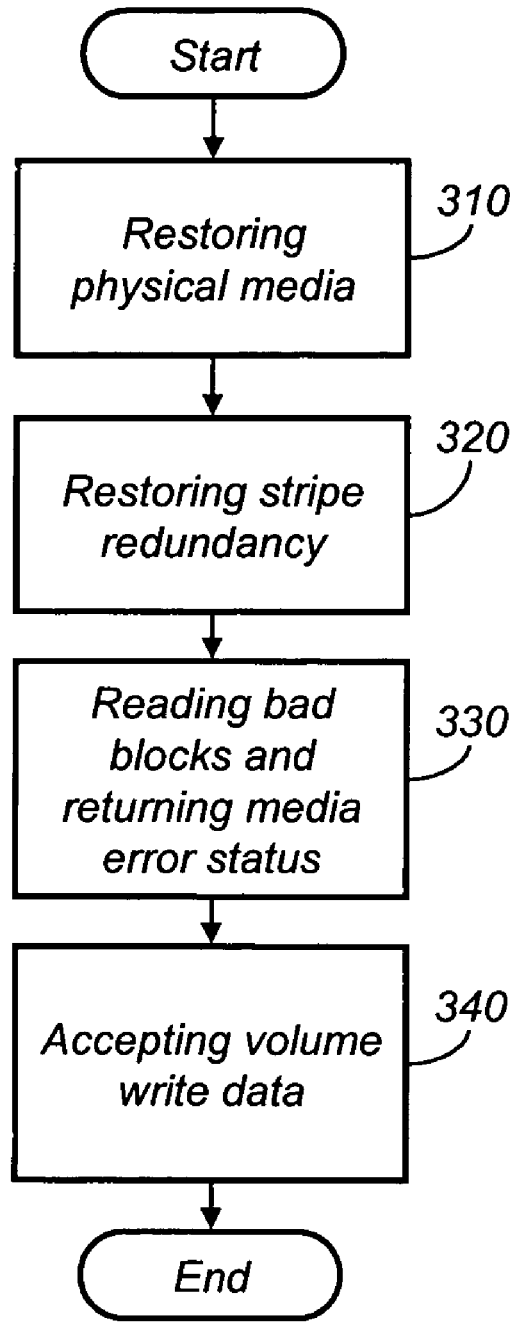
FIG. 3 is a flow diagram of a method of managing bad blocks.

FIG. 3 shows a flow diagram of a method 300 of managing bad blocks, as described above. Method 300 assumes the use of a RAID 5 system. However, it should be appreciated that the principles of the present invention are also applicable to other RAID levels. Method 300 also assumes that there has been a loss of volume sector data caused by a media error in a degraded stripe in network storage system architecture 100.

Step 310: Restoring Physical Media

In this step, storage controller 140 restores the physical media by reassigning the sector and creates bad block tracking structure 200. A detailed description of this step is provided in method 400. Method 300 proceeds to step 320.

Step 320: Restoring Stripe Redundancy

In this step, storage controller 140 restores stripe redundancy to the volume. A detailed description of this step is provided in method 400. Method 300 proceeds to step 330.

Step 330: Reading Bad Blocks and Returning Media Error Status

In this step, storage controller 140 returns media error status to host 110 on a volume read of volume map entry including one or more bad blocks 225. A detailed description of this step is provided in method 500. Method 300 proceeds to step 340.

Step 340: Accepting Volume Write Data

In this step, storage controller 140 accepts volume write data to the bad blocks and deletes bad block tracking structure 200 created in step 310. A detailed description of this step is provided in method 600. Method 300 ends.

Figure 4:
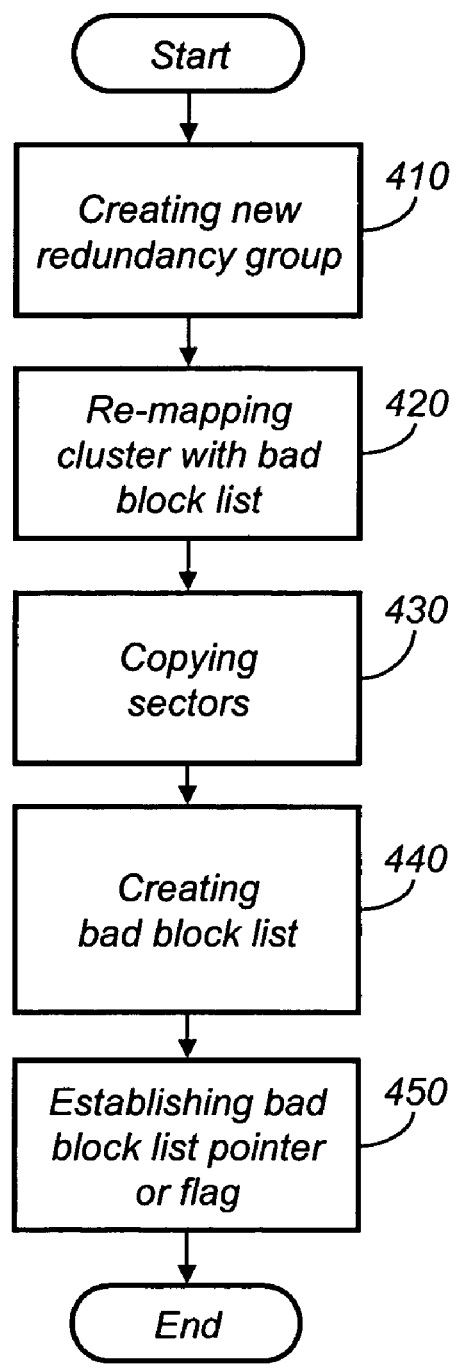
FIG. 4 is a flow diagram of a method of restoring physical media and restoring stripe redundancy.

FIG. 4 shows a flow diagram of a method 400 of restoring physical media and restoring stripe redundancy. Method 400 is a detailed description of steps 310 and 320 of method 300.

Step 410: Creating New Redundancy Group

In this step, storage controller 140 creates RAID 1 or RAID 10 redundancy group with one or more bad blocks 240 in redundancy group table 210, replacing RAID 5 redundancy group 235. Unlike RAID 5, RAID 1 and RAID 10 have mirroring capabilities. Method 400 proceeds to step 420.

Step 420: Re-mapping Cluster with Bad Block List

In this step, storage controller 140 allocates a single cluster from RAID 1 or RAID 10 redundancy group with one or more bad blocks 240 created in step 410. This achieves redundancy of all clusters in the sector without the need to restore parity. Instead, redundancy is achieved through mirroring. Method 400 proceeds to step 430.

Step 430: Copying Sectors

In this step, storage controller 140 copies the appropriate sectors from the volume map entry including one or more bad blocks 225 to the cluster allocated in step 420. Method 400 proceeds to step 440.

Step 440: Creating Bad Block List

In this step, storage controller 140 creates bad block list 250 in bad block table 215. Method 400 proceeds to step 450.

Step 450: Establishing Bad Block List Pointer or Flag

In this step, storage controller 140 establishes bad block list pointer or flag 245 by updating the pointer structure in RAID 1 or RAID 10 redundancy group with one or more bad blocks 240. Bad block list pointer or flag 245 identifies bad block list 250 created in step 440. Method 400 ends.

Figure 5:
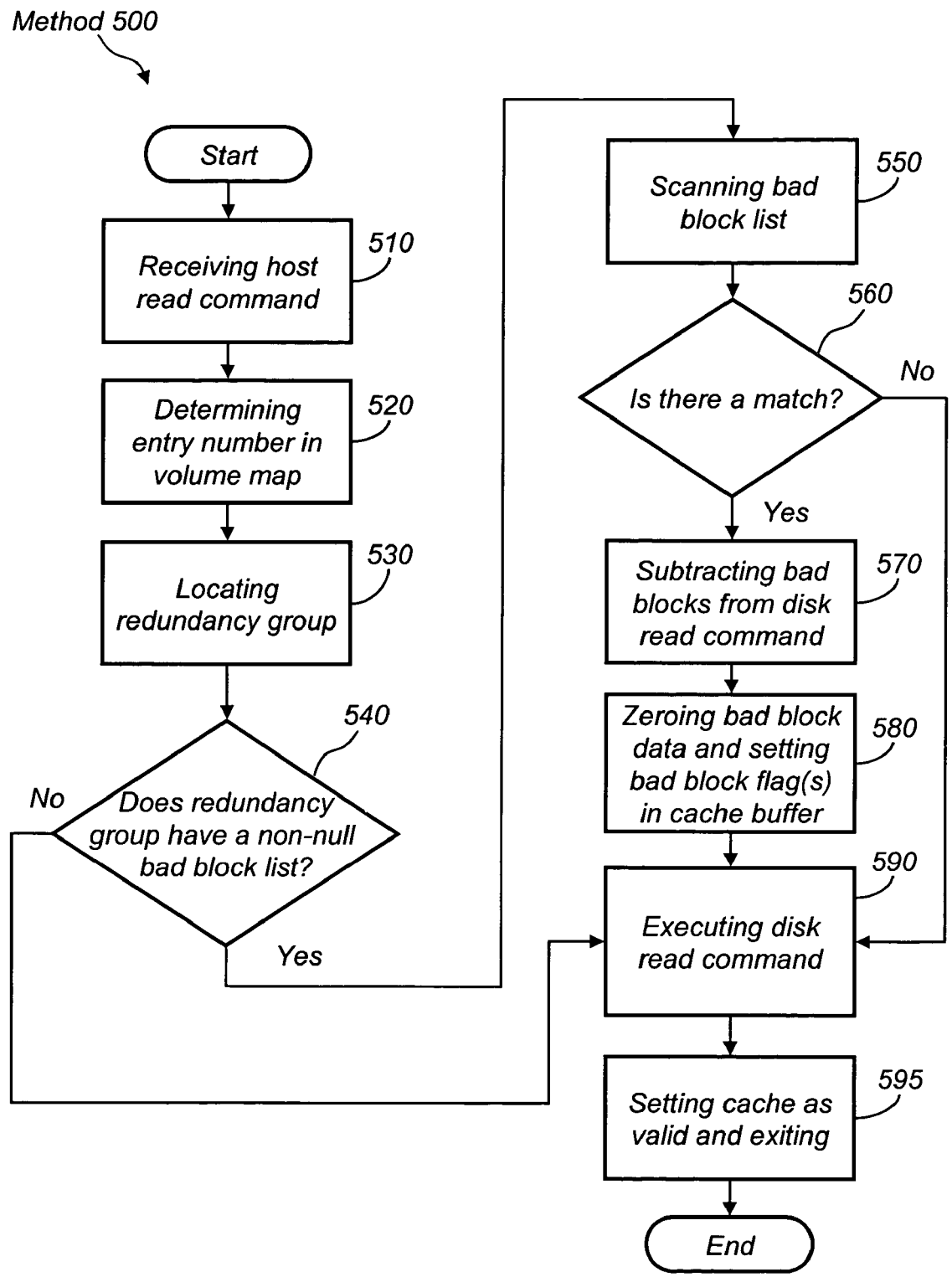
FIG. 5 is a flow diagram of a method of reading bad blocks.

FIG. 5 shows a flow diagram of a method 500 of reading volume map entry including one or more bad blocks 225. Method 500 is a detailed description of step 330 of method 300.

Step 510: Receiving Host Read Command

In this step, storage controller 140 receives a read command from host 110 via host port 115, host connection 125, network fabric 120, network interconnect 130, and controller port A 143. Storage controller 140 stores host read command in cache 145. Method 500 proceeds to step 520.

Step 520: Determining Entry Number in Volume Map

In this step, storage controller 140 uses a fine-grain mapping algorithm to determine an entry number in volume map 205. In one exemplary embodiment, the fine-grain mapping algorithm includes a hash function, which uses the upper bits of the volume LBA and the volume number to calculate the location of the segmented volume map pointer in a hash table. The pointer identifies the entry number in volume map 205. Method 500 proceeds to step 530.

Step 530: Locating Redundancy Group

In this step, storage controller 140 follows the volume map entry number determined in step 520 to RAID 1 or RAID 10 redundancy group with one or more bad blocks 240. Method 500 proceeds to step 540.

Step 540: Does Redundancy Group Have a Non-null Bad Block List?

In this step, storage controller 140 determines whether RAID 1 or RAID 10 redundancy group with one or more bad blocks 240 located in step 530 has a non-null bad block list 250. If yes, method 500 proceeds to step 550; if no, method 500 proceeds to step 590.

Step 550: Scanning Bad Block List

In this step, storage controller 140 scans bad block list 250 and compares bad block list 250 to the volume read range defined by host 110 in step 510. Method 500 proceeds to step 560.

Step 560: Is there a Match?

In this step, storage controller 140 determines whether there is a match between bad block list 250 and the volume read range defined by host 110 in step 510. If yes, method 500 proceeds to step 570; if no, method 500 proceeds to step 590.

Step 570: Subtracting Bad Blocks from Disk Read Command

In this step, storage controller 140 subtracts volume map entry including one or more bad blocks 225 in the volume read range defined by host 110 so that only valid data remains. Method 500 proceeds to step 580.

Step 580: Zeroing Bad Block Data and Setting Bad Block Flag(s) in Cache Buffer In this step, storage controller 140 sets the bad block flag(s) in the sector header of cache 145 for each bad block logical block address (LBA). Method 500 proceeds to step 590.

Step 590: Executing Disk Read Command

In this step, storage controller 140 executes the disk read command from step 510 to the buffer of cache 145 without setting cache 145 as not dirty. Method 500 proceeds to step 595.

Step 595: Setting Cache as Valid and Exiting

In this step, storage controller 140 sets cache 145 as valid and exits. Method 500 ends.

Figure 6:
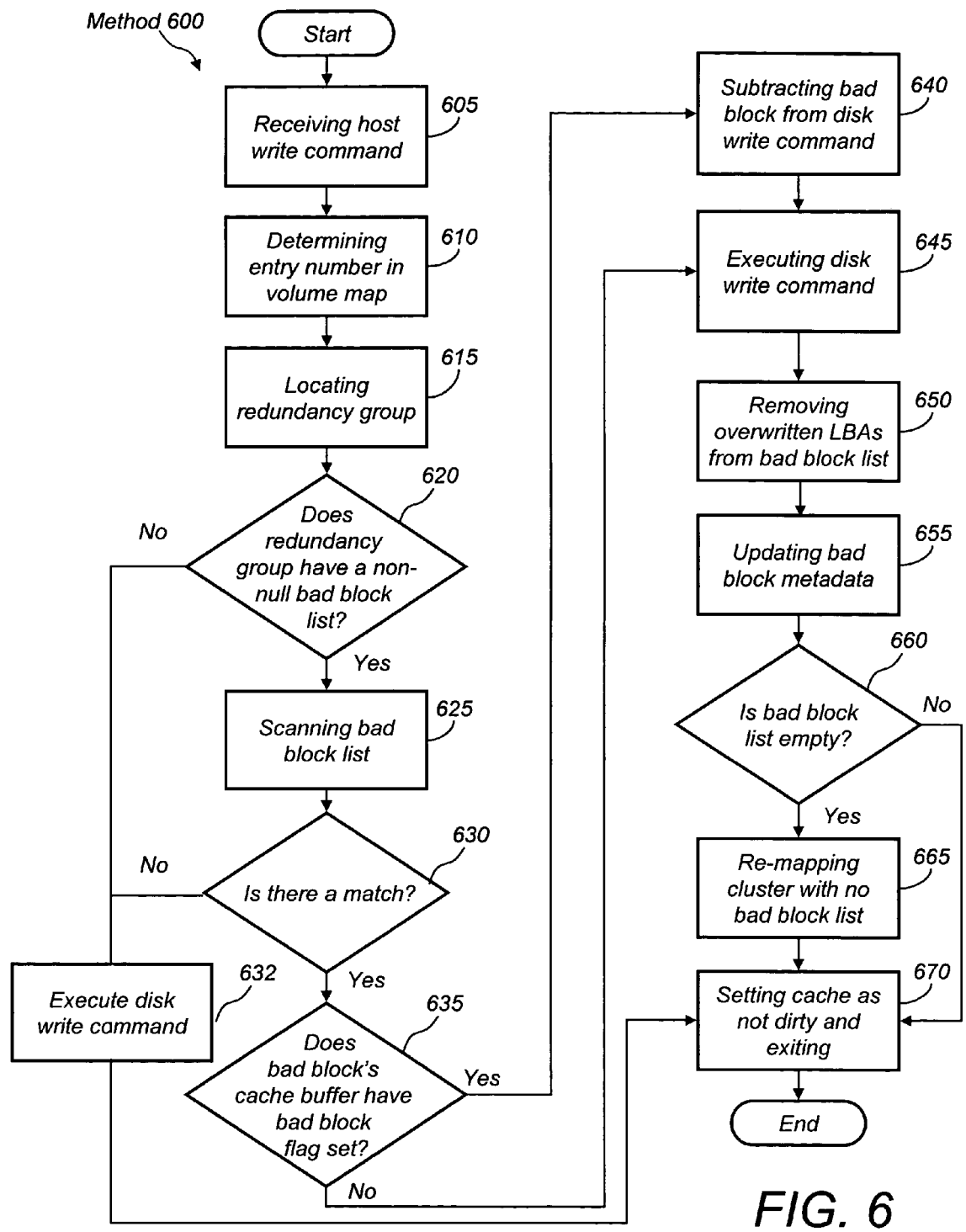
FIG. 6 is a flow diagram of a method of flushing or writing over bad blocks.

FIG. 6 shows a flow diagram of a method 600 of flushing or writing over bad blocks. Method 600 is a detailed description of step 340 of method 300.

Step 605: Receiving Host Write Command

In this step, storage controller 140 receives a write command from host 110 via host port 115, host connection 125, network fabric 120, network interconnect 130, and controller port A 143. Storage controller 140 stores the host write command in cache 145. Method 600 proceeds to step 610.

Step 610: Determining Entry Number in Volume Map

In this step, storage controller 140 uses a fine-grain mapping algorithm to determine an entry number in volume map 205. The fine-grain mapping algorithm includes a hash function, which uses the upper bits of the volume LBA and the volume number to calculate the location of the segmented volume map pointer in a hash table. The pointer identifies the entry number in volume map 205. Method 600 proceeds to step 615.

Step 615: Locating Redundancy Group

In this step, storage controller 140 follows the volume map entry number determined in step 610 to RAID 1 or RAID 10 redundancy group with one or more bad blocks 240. Method 600 proceeds to step 620.

Step 620: Does Redundancy Group Have a Non-null Bad Block List?

In this step, storage controller 140 determines whether RAID 1 or RAID 10 redundancy group with one or more bad blocks 240 located in step 615 has a non-null bad block list 250. If yes, method 600 proceeds to step 625; if no, method 600 proceeds to step 632.

Step 625: Scanning Bad Block List

In this step, storage controller 140 scans bad block list 250 and compares bad block list 250 to the write range defined by host 110 in step 605. Method 600 proceeds to step 630.

Step 630: Is there a Match?

In this step, storage controller 140 determines whether there is a match between bad block list 250 and the write range defined by host 110 in step 605. If yes, method 600 proceeds to step 635; if no, method 600 proceeds to step 632.

Step 632: Executing Disk Write Command

In this step, storage controller 140 executes the disk write command from step 605 to the buffer of cache 145 without setting cache 145 as not dirty. Method 600 proceeds to step 650. The method then proceeds to step 670.

Step 635: Does Bad Block's Cache Buffer Have Bad Block Flag Set?

In this step, storage controller 140 determines whether cache 145 has corresponding bad block flags set for the matches identified in step 630. If yes, method 600 proceeds to step 640; if no, method 600 proceeds to step 645.

Step 640: Subtracting Bad Blocks from Disk Write Command

In this step, storage controller 140 subtracts volume map entry including one or more bad blocks 225 in the volume write range defined by host 110 so that only valid data remains. Method 600 proceeds to step 645.

Step 645: Executing Disk Write Command

In this step, storage controller 140 executes the disk write command from step 605 to the buffer of cache 145 without setting cache 145 as not dirty. Method 600 proceeds to step 650.

Step 650: Removing Overwritten LBAs from Bad Block List

In this step, storage controller 140 removes each bad block LBA from bad block list 250. Method 600 proceeds to step 655.

Step 655: Updating Bad Block Metadata

In this step, storage controller 140 updates the bad block metadata (i.e., the persistent configuration data that stores bad block list 250). Method 600 proceeds to step 660.

Step 660: Is Bad Block List Empty?

In this step, storage controller 140 determines whether bad block list 250 is empty. If yes, method 600 proceeds to step 665; if no, method 600 proceeds to step 670.

Step 665: Re-mapping Cluster with No Bad Block List

In this step, storage controller 140 re-maps the cluster from RAID 1 or RAID 10 redundancy group with one or more bad blocks 240 to RAID 5 redundancy group 235. Method 600 proceeds to step 670.

Step 670: Setting Cache as not Dirty and Exiting

In this step, storage controller 140 sets cache 145 as not dirty and exits. Method 600 ends.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

The invention claimed is:

1. A method of operating a storage system having storage organized into a plurality of clusters each having a plurality of blocks, the method comprising:
   detecting a RAID level bad block in one of said clusters;
   recording in a data structure an indication of said RAID level bad block; and
   in response to the detection of said RAID level bad block, replacing a parity-based redundancy for non-bad blocks within the same cluster as said RAID level bad block with a mirroring-based redundancy.

2. The method of claim 1, wherein:
   said data structure comprises a bad block table, a redundancy group table, and a volume map table;
   said volume map table has a plurality of cluster pointers, each comprising a pointer to an entry in the redundancy group table and an offset specifying a cluster number within a redundancy group;
   said redundancy group table has a plurality of entries, each specifying a mapping function for a plurality of clusters within a particular redundancy group, and a flag for indicating whether any block in the particular redundancy group is a RAID level bad block, said flag being a pointer to the bad block table; and
   said bad block table stores an indication of each RAID level bad block associated with a particular redundancy group.

3. The method of claim 2, wherein said flag is set to a first predetermined value if no block in the particular redundancy group is a RAID level bad block.

4. The method of claim 3, wherein said first predetermined value is a null pointer.

5. The method of claim 1, wherein said mirroring-based redundancy comprises a RAID level 1 redundancy for each non-bad block in said same cluster.

6. The method of claim 1, wherein said mirroring-based redundancy comprises a RAID level 10 redundancy for each non-bad block in said same cluster.

7. The method of claim 1, wherein said step of detecting comprises:
   determining that a block is a RAID level bad block when, during an operation to restore a content of said block by reading each block in a cluster, one or more read errors are received.

8. A storage system, comprising:
   a plurality of storage devices, each of said plurality of storage devices organized into a plurality of clusters each having a plurality of blocks; and
   a storage controller, said storage controller including at least one host port for communicating with one or more hosts and at least one controller port for communicating with said plurality of storage devices,
   wherein, when said storage controller detects a RAID level bad block, said storage controller maintains a record of said RAID level bad block and temporarily replaces a redundancy scheme of each non-bad block in the same cluster as said RAID level bad block from a parity-based redundancy to a mirroring-based redundancy.

9. The storage system of claim 8, wherein said at least one host port is a network port for communicating with one or more hosts over a network.

10. The storage system of claim 8, wherein said storage controller further comprises:
a cache memory, for caching at least a portion of the contents of said plurality of storage devices.

11. The storage system of claim 8, wherein said storage controller further comprises:
a bad block table;
a redundancy group table; and
a volume map table;
wherein
said volume map table includes a plurality of entries each comprising a pointer to an entry in the redundancy group table;
said redundancy group table includes a plurality of entries each comprising an identification of a plurality of blocks in a cluster associated with a particular redundancy group, and a flag for indicating whether any block in the particular redundancy group is a RAID level bad block;
said flag being a pointer to the bad block table; and
said bad block table stores an indication of each RAID level bad block associated with a particular redundancy group.

12. The storage system of claim 8, wherein, when said storage controller processes a read request to a cluster which has at least one RAID level bad block, said storage controller returns a read error for each block determined to be a RAID level bad block.

13. The storage system of claim 8, wherein, when said storage controller processes a write request to a cluster which has at least one RAID level bad block, said storage controller writes to each block in the cluster, including any block identified as a RAID level bad block, and said storage controller removes a RAID level bad block record from each RAID level bad block which was written.

14. A method of operating a storage system comprising:
detecting a RAID level bad block;
recording in a data structure an indication of said RAID level bad block;
reading a plurality of blocks comprising a cluster of said storage system;
determining whether any of said plurality of blocks corresponds to said RAID level bad block;
for a block determined to correspond to said RAID level bad block, recording in a cache of said storage system an indication of said RAID level bad block; and
in response to the detection of said RAID level bad block, replacing a parity-based redundancy for the cluster with a mirroring-based redundancy while the parity-based redundancy is being restored if the cluster includes said RAID level bad block.

15. The method of claim 14, further comprising:
setting a bad block indication in a status field of a cache entry corresponding to said RAID level bad block.

16. The method of claim 15, further comprising:
clearing contents of said RAID level bad block; and
setting a valid status indication in said status field in said cache entry corresponding to said RAID level bad block of said storage system.

17. A method of operating a storage system, comprising:
maintaining a data structure to track RAID level bad blocks;
in response to a detection of a RAID level bad block, replacing a parity-based redundancy scheme with a mirroring-based redundancy scheme for non-bad blocks within a same cluster as at least one of said RAID level bad blocks;
determining whether any block associated with a write operation is a RAID level bad block by checking the data structure; and
for each block associated with the write operation which is determined to be a RAID level bad block,
writing to each said bad block; and
manipulating said data structure so said block is no longer indicated as a RAID level bad block.

18. A method of operating a storage system, comprising:
receiving a storage system read command and a storage system address from a host;
decoding the storage system address to identify a cluster and at least one block in said cluster;
assembling at least one disk read command directed to the blocks requested by said storage system read command;
for each block requested by the storage system read command,
determining whether the block corresponds to one or more RAID level bad blocks and, if so, removing the block from the disk read command and replacing a redundancy scheme of the cluster from a parity-based redundancy scheme to a mirroring-based redundancy scheme;
executing the disk read command; and
marking cache entries associated with the disk read command as valid.

19. The method of claim 18, wherein said step of decoding comprises:
hashing said storage system address;
indexing into a volume map table based upon said hashing to locate a pointer to a redundancy group table and an offset; and
following said pointer to an entry in said redundancy group table and applying said offset to identify a cluster comprising a plurality of blocks.

20. The method of claim 18, wherein said step of determining comprises:
if a bad block pointer in an entry of a redundancy group table associated with said storage system address is null, concluding that said at least one block does not include any RAID level bad blocks;
if said bad block pointer is non-null,
following said pointer to a bad block table;
for each requested block,
concluding that the requested block is a RAID level bad block if the block appears in said bad block table; and
concluding that the requested block is not a RAID level bad block if the block does not appear in said bad block table.

21. A method of operating a storage system, comprising:
receiving a storage system write command and a storage system address from a host;
decoding the storage system address to identify a cluster and at least one block in the cluster;
assembling at least one disk write command directed to the blocks specified in said write command;
for each block specified in said storage system write command,
determining whether the block corresponds to one or more RAID level bad blocks and
removing the block which corresponds to the one or more RAID level bad blocks and which has an associated cache entry marked with a bad block status from the disk write command;
executing said disk write command;
removing a RAID level bad block status from each block written by said disk write command and previously determined to be a RAID level bad block;
if, as a result of said disk write command, the RAID level bad block status of each previously determined RAID level bad block has been removed, converting the cluster which includes the previously determined RAID level bad blocks from a mirroring-based redundancy to a parity-based redundancy; and
marking cache entries associated with said disk write command as valid.

22. The method of claim 21, wherein said step of removing a RAID level bad block status comprises:
for each block written by said disk write command and previously determined to be a RAID level bad block,
modifying configuration data in said storage system to indicate a lack of RAID level bad block status.

23. The method of claim 21, wherein said step of removing a RAID level bad block status comprises:
removing each block written by said disk write command and previously determined to be a RAID level bad block from its respective bad block list.

24. The method of claim 23, further comprising:
if removing a block from a bad block list results in an empty list,
setting a bad block pointer from an entry in a redundancy group table to point to said empty list to a null pointer.

* * * * *